United States Patent
Fukano et al.

(10) Patent No.: US 9,091,352 B2
(45) Date of Patent: Jul. 28, 2015

(54) FLOW PATH OPENING/CLOSING VALVE

(71) Applicant: SMC KABUSHIKI KAISHA, Chiyoda-ku (JP)

(72) Inventors: Yoshihiro Fukano, Moriya (JP); Tadashi Uchino, Moriya (JP); Taiyou Hatta, Joso (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 13/900,804

(22) Filed: May 23, 2013

(65) Prior Publication Data

US 2014/0110615 A1    Apr. 24, 2014

(30) Foreign Application Priority Data

Oct. 22, 2012   (JP) .................................. 2012-233173

(51) Int. Cl.
| | |
|---|---|
| *F16K 5/00* | (2006.01) |
| *F16K 5/06* | (2006.01) |
| *F16K 5/20* | (2006.01) |

(52) U.S. Cl.
CPC .............. *F16K 5/0647* (2013.01); *F16K 5/0689* (2013.01); *F16K 5/201* (2013.01)

(58) Field of Classification Search
CPC ....... F16K 27/067; F16K 5/06; F16K 5/0626; F16K 5/0636; F16K 5/0631
USPC ........... 251/315.1, 315.13, 315.16, 314, 291, 251/292, 315.01, 315.14; 137/269, 271
See application file for complete search history.

(56) References Cited

U.S. PATENT DOCUMENTS

| | | | | |
|---|---|---|---|---|
| 3,096,965 | A * | 7/1963 | Margus et al. | 251/170 |
| 4,605,199 | A * | 8/1986 | Bonissone et al. | 251/171 |
| 4,605,202 | A * | 8/1986 | Tsuno et al. | 251/315.13 |
| 4,667,928 | A * | 5/1987 | Davatz et al. | 251/315.13 |
| 4,684,105 | A * | 8/1987 | Haas, II | 251/150 |
| 4,815,704 | A | 3/1989 | Berchem | |
| 4,869,450 | A * | 9/1989 | Takeda et al. | 251/315.05 |
| 5,181,539 | A * | 1/1993 | Yokoyama | 137/625.32 |

(Continued)

FOREIGN PATENT DOCUMENTS

| | | |
|---|---|---|
| JP | 10-061790 | 6/1998 |
| KR | 10-1187045 | 10/2012 |

OTHER PUBLICATIONS

Korean Office Action dated Jun. 27, 2014 for Korean Patent Application No. 10-2013-0070283 with English translation of relevant portion thereof.

*Primary Examiner* — John K Fristoe, Jr.
*Assistant Examiner* — Angelisa Hicks
(74) *Attorney, Agent, or Firm* — Oblon, McClelland, Maier & Neustadt, L.L.P.

(57) ABSTRACT

A flow path opening/closing valve is equipped with a main body having a valve chamber housing therein a rotatable valve body, and a sleeve that abuts without gaps against an inner circumferential surface of the valve chamber, such that the inner circumferential surface of the valve chamber and an inner circumferential surface of the sleeve slide without gaps against an outer circumferential surface of the valve body, for thereby shielding the valve chamber by the valve body and the sleeve. First and second seat members, and first and second o-rings that urge the first and second seat members toward the side of the valve body are arranged inside first and second annular grooves, which are provided on the inner circumferential surface and the inner circumferential surface.

9 Claims, 5 Drawing Sheets

(56) References Cited

U.S. PATENT DOCUMENTS

| | | | |
|---|---|---|---|
| 5,735,307 A * | 4/1998 | Charron | 137/270 |
| 7,306,010 B2 * | 12/2007 | Gruener, Sr. | 137/797 |
| 2006/0196567 A1 * | 9/2006 | Gruener, Sr. | 137/797 |
| 2008/0283787 A1 | 11/2008 | Zambonin et al. | |

* cited by examiner

FLOW PATH OPENING/CLOSING VALVE

CROSS-REFERENCE TO RELATED APPLICATION

This application is based upon and claims the benefit of priority from Japanese Patent Application No. 2012-233173 filed on Oct. 22, 2012, the contents of which are incorporated herein by reference.

BACKGROUND OF THE INVENTION

1. Field of the Invention

The present invention relates to a flow path opening/closing valve for switching a flow through state of a fluid by opening and closing a flow path through which the fluid flows.

2. Description of the Related Art

Heretofore, a flow path opening/closing valve has been known which, for example, is connected to a flow path through which a fluid flows, and which controls a flow through state of the fluid by switching a state of communication of the flow path.

As a flow path opening/closing valve of this type, in U.S. Pat. No. 4,815,704, there is disclosed a "ball valve" structure having a spherical valve. In the flow path opening/closing valve, a valve chamber is provided, which accommodates therein the spherical valve in the interior of a valve main body. By rotating a shaft, which is connected to an upper portion of the valve, a through hole of the valve establishes communication between a pair of passages (fluid inlet port and fluid outlet port) formed in the valve main body. Annular seal members are provided on the side of the fluid inlet port and the side of the fluid outlet port of the valve, which function as valve seats for supporting the valve, and slide against the outer circumferential surface of the valve to prevent fluid from leaking into the interior of the valve chamber.

Figure 5:
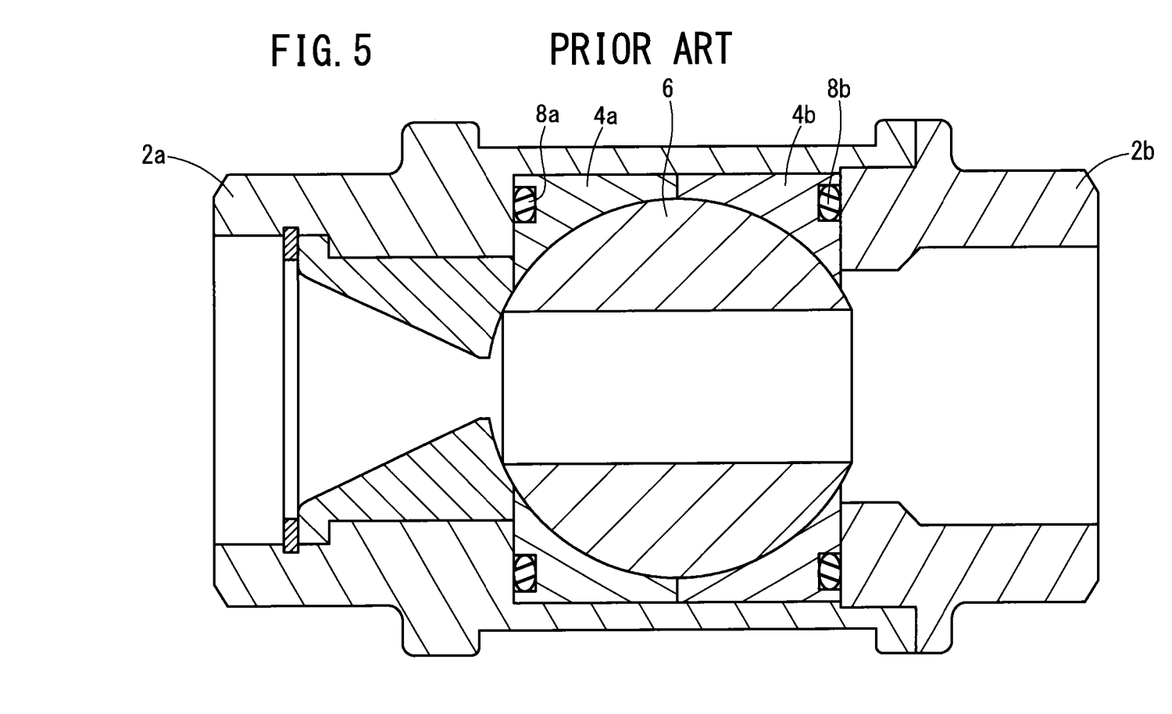
FIG. 5 is a vertical cross sectional view of a flow path opening/closing valve according to the conventional technique disclosed in U.S. Patent Application Publication No. 2008/0283787.

Further, U.S. Patent Application Publication No. 2008/0283787 discloses a "ball valve". As shown in FIG. 5, seal members 4a, 4b have a pair of curved surfaces and are arranged in the interior of a first body 2a. End surfaces of the seal members 4a, 4b abut against each other such that the seal members 4a, 4b sandwich therebetween a spherical valve body 6 in which the fluid passage is formed. The spherical valve body 6 slides against the curved surfaces and is retained rotatably. O-rings 8a, 8b are provided respectively on surfaces of the seal members 4a, 4b, which face toward the fluid inlet port and the fluid outlet port. The second body 2b is fitted into the first body 2a, and by the second body 2b pressing the o-ring 8b, the seal members 4a, 4b are pressed into contact, whereby a sealing effect is carried out in cooperation with the o-ring 8a.

SUMMARY OF THE INVENTION

However, according to the conventional technique of U.S. Pat. No. 4,815,704, in the valve chamber, a constant gap is formed between the inner circumferential surface of the valve chamber, the annular seal members, and the outer circumferential surface of the valve. Consequently, when the flow path is opened and closed, accompanying rotation of the valve, the aforementioned gap and the flow path are temporarily placed in communication via the through hole of the valve, whereby a portion of the fluid infiltrates into the gap. When rotation of the valve is completed, the infiltrated fluid is not returned to the flow path but remains within the gap, and the retained fluid becomes altered in character and corrupted, leading to corrosion of the valve and the valve main body. Thus, a disadvantage occurs in that trace amounts of the corrupted fluid become mixed with in the flow path and contaminate the clean fluid that is supplied to the flow path.

According to the conventional technique of U.S. Patent Application Publication No. 2008/0283787, inner circumferential surfaces of adjoined seal members 4a, 4b slide against the outer circumferential surface of the valve body 6, and outer circumferential surfaces of the seal members 4a, 4b abut against the inner circumferential surface of the valve chamber, and the seal members 4a, 4b are formed with a substantially annular shape. Consequently, in the interior of the valve chamber, since a sealing structure is formed by the valve body and the seal members 4a, 4b, fluid does not infiltrate into the valve chamber, and a gap is not formed in which fluid is retained in the same manner as in the conventional technique of U.S. Pat. No. 4,815,704. However, inner circumferential surfaces of the seal members 4a, 4b are continuously in sliding contact with the outer circumferential surface of the valve body 6, and therefore, when rotation of the valve body 6 is carried out continuously over a long period of time, the seal members 4a, 4b are subject to wear and the sealing function thereof deteriorates. As a result, even in a valve-closed state, a disadvantage occurs in that fluid tends to leak from the flow path.

Furthermore, as such wearing of the seal members 4a, 4b progresses, small gaps are formed at worn locations of the seal members 4a, 4b, so that similar to the conventional technique of U.S. Pat. No. 4,815,704, part of the fluid infiltrates and becomes retained in the small gaps, whereby the valve body 6 and the first body 2a are subject to corrosion, and a disadvantage occurs in that clean fluid that passes through the flow path inside the valve body 6 becomes contaminated.

The present invention has been made in an effort to overcome the disadvantages of the aforementioned conventional techniques, and has the object of providing a flow path opening/closing valve in which, even if seal members thereof are subjected to wear due to sliding contact of the valve body, a continuous and stable sealing performance can be assured, and even if used over a prolonged period, gaps are not formed in which fluid infiltrates and becomes retained.

For achieving the aforementioned object, the present invention is characterized by a flow path opening/closing valve comprising a valve body having a through hole therein, a main body having a fluid inlet port and provided with a valve chamber in which the valve body is rotatably accommodated, a stopper having a fluid outlet port communicating with the fluid inlet port and which is secured to the main body, a handle that rotates the valve body inside the valve chamber for blocking communication between the fluid inlet port and the fluid outlet port, and a sleeve disposed in the interior of the main body and which slides against the valve body and is provided with a through hole therein that establishes communication between the fluid inlet port and the fluid outlet port.

An annular groove is provided in a surface of the sleeve that faces toward the valve body, and a seat member that slides against the valve body is arranged in the annular groove.

According to the above-described configuration, a shielding structure can be provided in the interior of the valve chamber by the sleeve and the valve body. Owing thereto, gaps are not formed inside the valve chamber in which fluid infiltrates and becomes retained, and corrosion of the valve body and the main body, or contamination of the fluid that flows through the passageway in the interior of the valve body, can be prevented.

Further, since the seal members perform a sealing function, even if inner circumferential surfaces of the sleeve and the main body become worn due to sliding contact with the valve body, a stable sealing performance can always be assured.

Further, in the flow path opening/closing valve, another annular groove confronting the annular groove of the sleeve may be provided in the main body, and another seat member, which confronts the seat member, may be provided in the other annular groove, such that the other seat member slides against the valve body.

According to the above-described structure, because the seat member and the other seat member perform a sealing function, even if wearing occurs due to sliding contact of the inner circumferential surface of the sleeve or the main body with the valve body, a stable sealing performance can always be assured.

Furthermore, in the flow path opening/closing valve, an elastic member may be provided in the annular groove of the sleeve so as to contact the seat member.

According to the above-described structure, because the seat member is continuously urged by the elastic member toward the side of the valve body, even if wearing of the seat member occurs due to sliding against the valve body, the seat member can be kept in intimate contact with the valve body stably and reliably by the pressing force of the elastic member. As a result, a stable sealing performance can always be assured, and leakage of fluid that passes between the valve body and the seat member can reliably be prevented.

Further, in the flow path opening/closing valve, another elastic member may be provided in the other annular groove provided in the main body so as to contact the other seat member.

According to the above-described structure, because the other seat member is continuously urged by the other elastic member toward the side of the valve body, even if wearing of the other seat member occurs due to sliding against the valve body, the other seat member can be kept in intimate contact with the valve body stably and reliably by the pressing force of the other elastic member. As a result, a stable sealing performance can always be assured, and leakage of fluid that passes between the valve body and the other seat member can reliably be prevented.

Furthermore, in the flow path opening/closing valve, the elastic member may be an o-ring.

According to the above-described structure, because the seat member is continuously urged by the elastic force of the o-ring toward the side of the valve body, even if wearing of the seat member occurs due to sliding against the valve body, the seat member can be kept in intimate contact with the valve body stably and reliably by the pressing force of the o-ring. Furthermore, since the o-ring itself carries out a sealing function, leakage of fluid that passes between the valve body and the seat member can reliably be prevented.

Further, in the flow path opening/closing valve, the other elastic member may be an o-ring.

According to the above-described structure, because the other seat member is continuously urged by the elastic force of the o-ring toward the side of the valve body, even if wearing of the other seat member occurs due to sliding against the valve body, the other seat member can be kept in intimate contact with the valve body stably and reliably by the pressing force of the o-ring. Furthermore, since the o-ring itself carries out a sealing function, leakage of fluid that passes between the valve body and the other seat member can reliably be prevented.

Further, in the flow path opening/closing valve, a first screw member may be provided on the stopper, a second screw member may be provided on the main body, and by screw-engagement between the first screw member and the second screw member, the sleeve may be pressed via the stopper, whereby the sleeve is pressed into contact with the valve body.

According to the above-described structure, because the sleeve is continuously pressed toward the side of the valve body by the stopper, the sleeve can be kept in intimate contact with the valve body stably and reliably.

Further, in the flow path opening/closing valve, multiple cutouts may be provided on a side of the fluid outlet port of the stopper, whereas small projections may be provided on the handle at positions corresponding to the positions of the multiple cutouts, wherein the stopper is attachable and detachable with respect to the main body by engagement of the small projections in the cutouts.

According to the above-described structure, because the handle can also be used as a detachable fixture of the stopper, during assembly operations or exchange of parts or the like, there is no need to separately prepare a fixture that is used merely for attachment and detachment, so that assembly and disassembly operations of the flow path opening/closing valve can easily be carried out.

More specifically, according to the present invention, even if the seat members are subject to wear due to sliding contact with the valve body, the sealing properties thereof can always be assured in a stable manner, such that even if used over a prolonged period, gaps are not formed into which the fluid infiltrates and is retained. Thus, corrosion of the valve body and the main body, and contamination of the fluid that passes through the interior of the valve body can be prevented.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a flow path opening/closing valve according to the present invention will be described below with reference to the accompanying drawings.

Figure 1:
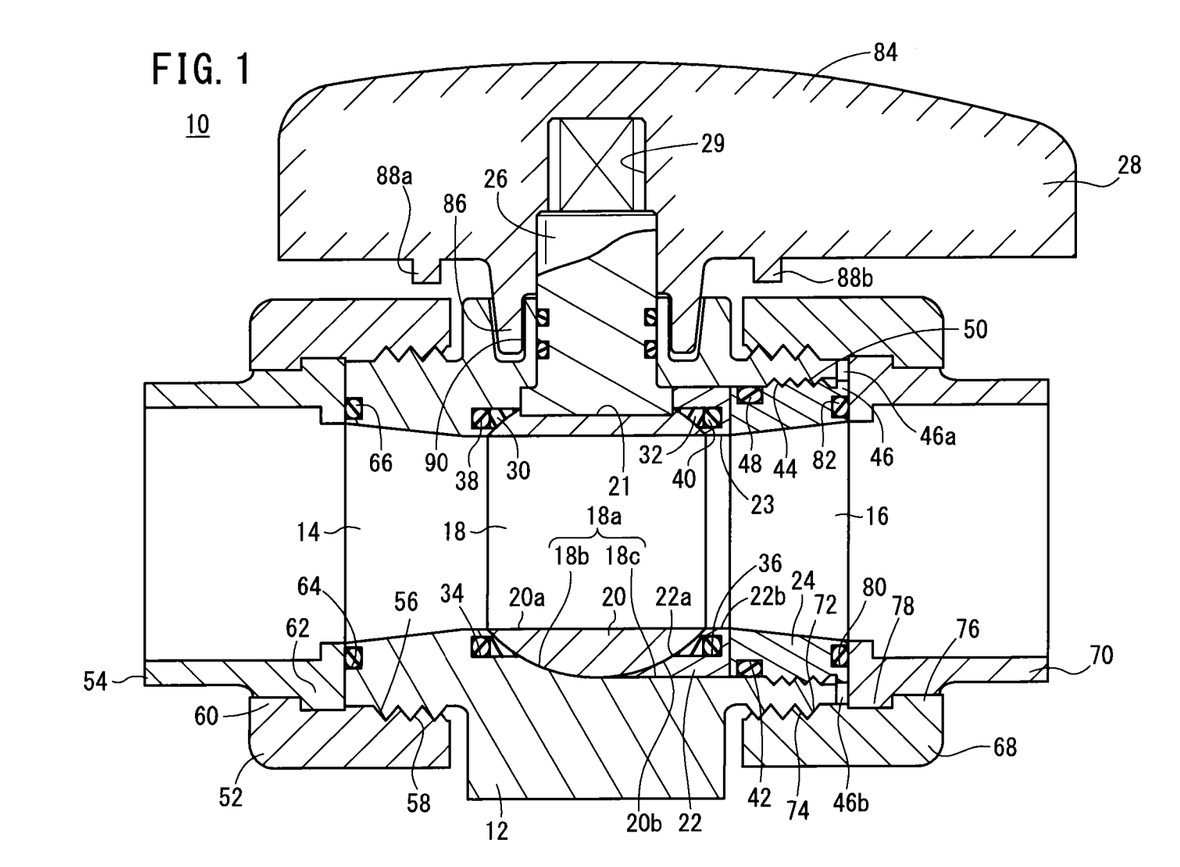
FIG. 1 is a vertical cross sectional view of a flow path opening/closing valve according to an embodiment of the present invention.

In FIG. 1, reference numeral 10 indicates a flow path opening/closing valve according to an embodiment of the present invention. The flow path opening/closing valve 10 includes a main body 12. A fluid inlet port 14 is formed on one end side of the main body 12, and a fluid outlet port 16 that communicates with the fluid inlet port 14 is formed on another end side of the main body 12.

Figure 2:
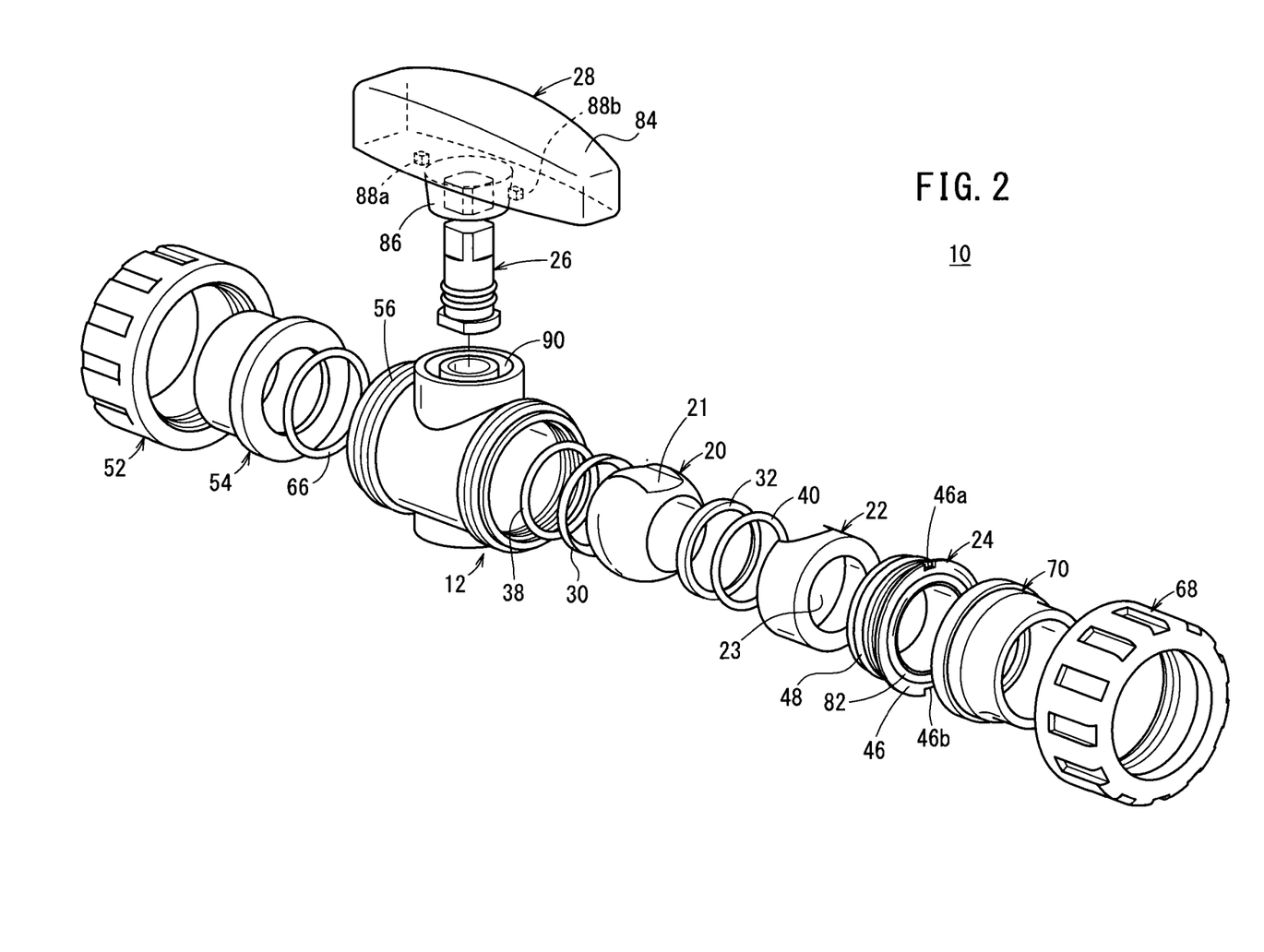
FIG. 2 is an exploded perspective view of the flow path opening/closing valve shown in FIG. 1.

As shown in FIGS. 1 and 2, in the main body 12, a valve chamber 18 is formed between the fluid inlet port 14 and the fluid outlet port 16. A spherical valve body 20 in which a through hole 20a is provided is accommodated rotatably in the interior of the valve chamber 18, and a sleeve 22 is arranged on the fluid outlet port 16 side of the valve body 20. The fluid inlet port 14 side of the sleeve 22 is in contact with the valve body 20, and on the fluid outlet port 16 side thereof, a substantially cylindrical stopper 24 is provided, which presses the sleeve 22 against the side of the valve body 20.

The sleeve 22 is roughly annular shaped overall, and a through hole 23 is provided therein, which enables communication between the fluid inlet port 14 and the fluid outlet port 16. On an inner side that forms the through hole 23 of the sleeve 22, an inner circumferential surface 22a corresponding to an outer circumferential surface 20b of the valve body 20, and an inner circumferential surface 22b which is contiguous to the inner circumferential surface 22a and is formed of substantially the same inner diameter as the through hole 20a of the valve body 20, are formed.

A recess 21 that extends in an axial direction is disposed on an upper part of the valve body 20. An end of a shaft 26, which rotates the valve body 20, is fitted into the recess 21. The shaft 26 projects from the main body 12, and a handle 28 for rotating the valve body 20 is connected detachably to the other end of the shaft 26. As shown in FIG. 1, o-rings, which perform a sealing function, are interposed between the shaft 26 and the inner wall of an annular projecting portion of the main body 12.

Within an inner circumferential surface 18a of the valve chamber 18, on an inner circumferential surface 18b on the side of the fluid inlet port 14, a first annular groove 34 is formed, whereas on the inner circumferential surface 22a of the sleeve 22 facing the valve body 20, a second annular groove 36 is formed in confronting relation to the first annular groove 34.

Preferably, in the first annular groove 34, a first o-ring (elastic member) 38 is arranged so as to overlap in the axial direction with a first seat member 30 made from an elastic body. Preferably, in the second annular groove 36, a second o-ring (elastic member) 40 is arranged in a similar manner so as to overlap in the axial direction with a second seat member 32 made from an elastic body. The first seat member 30 and the second seat member 32 are both annular or ring-shaped, and are equipped with curved surfaces so as to abut, respectively, without gaps against the outer circumferential surface 20b on the fluid inlet port 14 side and the fluid outlet port 16 side of the valve body 20. More specifically, the first o-ring 38 is disposed in a deepest part of the first annular groove 34, the first seat member 30 is arranged on an open side of the first annular groove 34, the second o-ring 40 is disposed in a deepest part of the second annular groove 36, and the second seat member 32 is arranged on an open side of the second annular groove 36. Owing thereto, as described later, the first seat member 30 is pressed by the elastic force of the first o-ring 38 into contact against the outer circumferential surface 20b of the valve body 20, whereas the second seat member 32 is pressed by the elastic force of the second o-ring 40 into contact against the outer circumferential surface 20b of the valve body 20.

In this case, if necessary, the first annular groove 34, the first seat member 30, and the first o-ring 38 may be omitted.

Within the inner circumferential surface 18a of the valve chamber 18, the inner circumferential surface 18b on the side of the fluid inlet port 14 is curved in a concave shape to abut against the outer circumferential surface 20b of the valve body 20, and an inner circumferential surface 18c on the side of the fluid outlet port 16 abuts against the outer circumferential surface of the sleeve 22. The inner circumferential surface 22a of the sleeve 22 that faces toward the valve body 20 is curved in a concave shape to abut against the outer circumferential surface 20b of the valve body 20.

More specifically, in a valve-open state, the outer circumferential surface 20b of the valve body 20 abuts against the inner circumferential surface 18b on the side of the fluid inlet port 14, the first seat member 30, the inner circumferential surface 22a of the sleeve 22, and the second seat member 32. Owing thereto, no gaps are formed that allow infiltration and retention of a portion of the fluid between the valve body 20 and the inner circumferential surface 18a of the valve chamber 18, and the space inside the valve chamber 18 is constructed such that infiltration of fluid is prevented by the valve body 20 and the sleeve 22.

Figure 4:
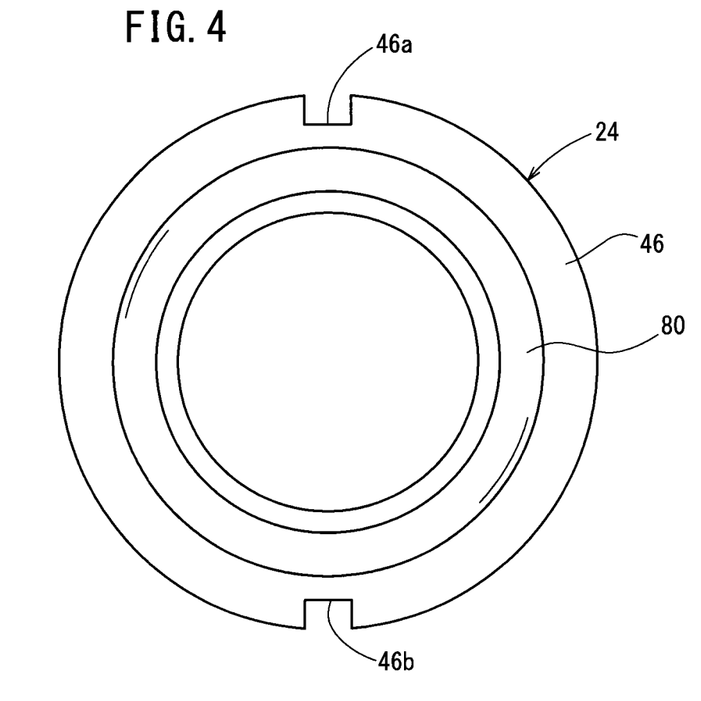
FIG. 4 is a side view of the stopper in the flow path opening/closing valve shown in FIG. 1.

A third annular groove 42, a male screw section (first screw member) 44, and a flange 46, which projects radially outward from the outer circumferential surface, are provided respectively on the outer circumferential surface of the stopper 24, in a direction from the side of the fluid inlet port 14 toward the side of the fluid outlet port 16. A third o-ring 48 is disposed in the third annular groove 42. The male screw section 44 is screw-engaged with a female screw section (second screw member) 50, which is engraved on the inner circumferential surface of the main body 12 on the side of the fluid outlet port 16, whereby the stopper 24 is fixed to the side of the fluid outlet port 16 of the main body 12. In this case, when the male screw section 44 of the stopper 24 is screw-engaged with respect to the female screw section 50 of the main body 12, the stopper 24 moves toward the side of the fluid inlet port 14, thereby pressing the sleeve 22. As a result, combined with the elastic force of the second o-ring 40, the second seat member 32 is pressed into contact with the curved surface of the valve body 20. The pressing force presses the first seat member 30 via the valve body 20, and the first seat member 30 receives the elastic force of the first o-ring 38. As a result, the first seat member 30 is pressed into contact against the curved surface on the side of the fluid inlet port 14 of the valve body 20. Further, as shown in FIGS. 2 and 4, cutouts 46a, 46b are provided on the outer periphery of the flange 46.

A substantially cylindrical shaped first union nut 52, and a substantially cylindrical shaped first union end 54 are arranged on the side of the fluid inlet port 14 of the main body 12. A female screw section 58, which is screw-engaged with a male screw section 56 formed on the outer circumferential surface of the main body 12 on the side of the fluid inlet port 14, is provided on the inner circumferential surface on the fluid outlet port 16 side of the first union nut 52, and together therewith, a first inner flange 60 that projects in a radial inward direction is disposed on the side of the fluid inlet port 14. On the other hand, a first outer flange 62, which projects in an outer circumferential direction, is disposed on the outer circumferential surface of the first union end 54, on an end thereof on the side of the fluid outlet port 16.

A fourth annular groove 64 is provided on an end surface on the fluid inlet port 14 side of the main body 12, and a fourth o-ring 66 is fitted in the fourth annular groove 64. Through engagement of the first inner flange 60 with the first outer flange 62, and by screw-engagement between the male screw section 56 of the main body 12 and the female screw section 58 of the first union nut 52, the first union end 54 is fixed to an end surface of the fluid inlet port 14 via the fourth o-ring 66.

A substantially cylindrical shaped second union nut 68, and a substantially cylindrical shaped second union end 70 are arranged on the side of the fluid outlet port 16 of the main body 12. A female screw section 74, which is screw-engaged with a male screw section 72 formed on the main body 12 on the side of the fluid outlet port 16, is provided on the inner circumferential surface on the fluid outlet port 16 side of the second union nut 68, and together therewith, a second inner flange 76 is provided that projects in a radial inward direction. On the other hand, a second outer flange 78, which projects in a radial outward direction, is disposed on the outer circumferential surface of the second union end 70.

A fifth annular groove 80 is provided on the fluid outlet port 16 side end surface of the stopper 24, and a fifth o-ring 82 is fitted in the fifth annular groove 80. The second inner flange 76 engages with the second outer flange 78, and by threaded engagement between the male screw section 72 of the main body 12 and the female screw section 74 of the second union nut 68, the second union end 70 is fixed to an end surface of the fluid outlet port 16 via the fifth o-ring 82.

The handle 28 is constituted from a gripper 84 having an insertion hole 29 therein in which the shaft 26 is inserted, a substantially cylindrical guide member 86 that projects toward the main body 12 from the gripper 84, and a pair of small projections 88a, 88b separated a predetermined distance from the guide member 86 and which project toward the main body 12. The guide member 86 is erected around the insertion hole 29 in which the shaft 26 is inserted, and is loosely fitted in an annular groove 90 provided on an upper part of the main body 12.

Figure 3:
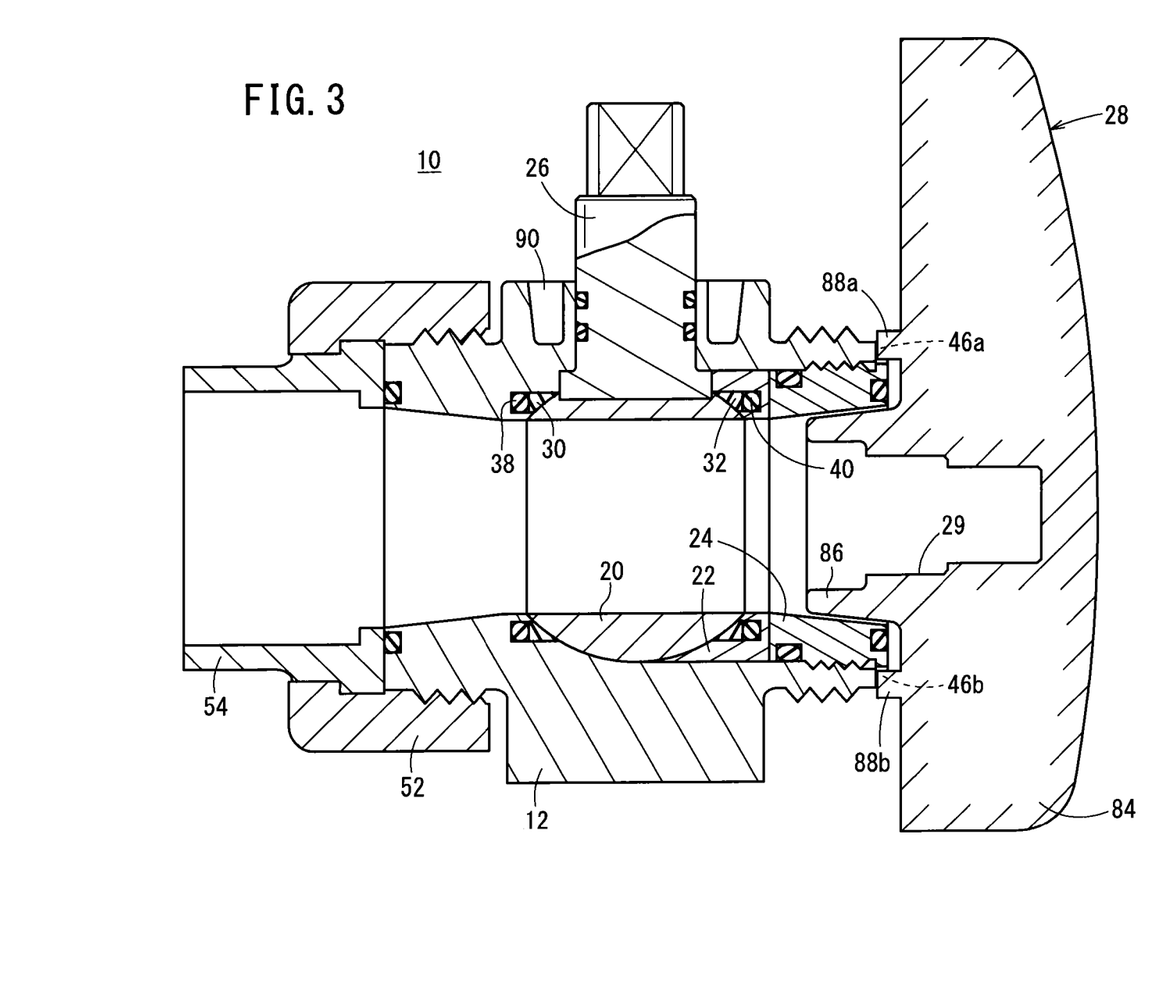
FIG. 3 is a vertical cross sectional view showing, in the flow path opening/closing valve of FIG. 1, a condition in which a handle is detached from the shaft and is fitted onto the stopper.

Incidentally, as shown in FIG. 3, the handle 28 does not merely function as an operating member for rotating the shaft 26 and performing an opening/closing action of the flow path, but rather, when disassembly and cleaning or exchange of parts is carried out on the flow path opening/closing valve 10, also functions as a fixture for taking out or tightening the stopper 24 from or on the main body 12. For this reason, the outer diameter of the guide member 86 is substantially the same as or slightly smaller than the inner diameter of the stopper 24, so as to enable the guide member 86 to be fitted into the inner circumference of the stopper 24, and the outer circumferential wall of the guide member 86 is formed to match the tapered shape of the inner circumferential surface of the stopper 24. Further, the small projections 88a, 88b are disposed at positions to fit in the cutouts 46a, 46b provided on the flange 46 of the stopper 24 when the guide member 86 is inserted into the inner side of the stopper 24.

The flow path opening/closing valve 10 according to the embodiment of the present invention is constructed basically as described above. Next, operations and advantageous effects of the flow path opening/closing valve 10 will be explained. A valve-open state, as shown in FIG. 1, in which the fluid inlet port 14 and the fluid outlet port 16 are placed in communication through the through hole 20a of the valve body 20, shall be described as an initial position.

In the initial position, the first seat member 30 and the second seat member 32 are in abutment against the outer circumferential surface 20b of the valve body 20, and a seal is formed between the outer circumferential surface 20b of the valve body 20 and the inner circumferential surface 18b of the valve chamber 18, as well as the inner circumferential surface 22a of the sleeve 22.

When the handle 28 is rotated by 90 degrees from the initial position, the shaft 26 rotates together therewith, and accompanying rotation of the shaft 26, the valve body 20 is rotated in the interior of the valve chamber 18. At this time, the through hole 20a also is rotated by 90 degrees, and as a result, communication between the fluid inlet port 14 and the fluid outlet port 16 is blocked to thereby bring about a valve-closed state. On the other hand, when the handle 28 is rotated by 90 degrees in the opposite direction to return to the initial position, the through hole 20a, the fluid inlet port 14, and the fluid outlet port 16 are placed in communication to thereby bring about a valve-open state.

By repeating the foregoing opening and closing operations, a certain amount of wear occurs due to sliding contact of the valve body 20 against the first seat member 30 and the second seat member 32. However, even if the first seat member 30 and the second seat member 32 become worn, the first seat member 30 and the second seat member 32 are pressed by elastic forces of the first o-ring 38 and the second o-ring 40 into contact against the curved outer circumferential surface 20b of the valve body 20. Owing thereto, by means of the first seat member 30 and the second seat member 32, a stable sealing performance can always be assured. As a result, fluid does not leak between the valve body 20, the first seat member 30, and the second seat member 32. Further, because the first seat member 30 and the second seat member 32 are pressed by the elastic forces of the first o-ring 38 and the second o-ring 40, even in the event that worn locations occur, formation of small gaps can be prevented.

Further, the inner circumferential surface 22a of the sleeve 22 and the inner circumferential surface 18a of the valve chamber 18 that confront the valve body 20 are bent in a concave shape to abut at the same curvature with the outer circumferential surface 20b of the valve body 20. Owing thereto, the valve chamber 18 is blocked by the valve body 20 and the sleeve 22, so that infiltration of fluid into the valve chamber 18, and formation of gaps that retain fluid therein do not occur. As a result, fluid is not retained in the valve chamber 18, corrosion of the valve body 20 or the main body 12 is prevented, and contamination of the clean fluid that passes through the flow path in the interior of the valve body can be prevented.

Further, the stopper 24 is arranged by screw-attachment thereof on the fluid outlet port 16 side of the sleeve 22, whereby the sleeve 22 is continuously pressed by the stopper 24 toward the side of the valve body 20. Accordingly, the inner circumferential surface 22a of the sleeve 22 and the second seat member 32 can be maintained in a state of abutment against the outer circumferential surface 20b of the valve body 20.

On the other hand, as discussed above, according to the embodiment of the present invention, the handle 28 functions not only as an operating element for rotating the shaft 26, but also can be used as a fixture for removal and attachment of the stopper 24 from the main body 12. When put to use in this manner, first, the second union nut 68 disposed on the side of the fluid outlet port 16 is rotated, threaded engagement between the male screw section 72 and the female screw section 74 is released, and the second union nut 68 and the second union end 70 are removed from the main body 12. Next, as shown in FIG. 3, the handle 28 is removed from the shaft 26, and the guide member 86 of the handle 28 is inserted into the stopper 24. At this time, the small projections 88a, 88b become enmeshed with the cutouts 46a, 46b provided on the flange 46 of the stopper 24. In this condition, when the handle 28 is rotated, by mutual engagement between the small projections 88a, 88b and the cutouts 46a, 46b, the stopper 24 is rotated, whereby the stopper 24 can be taken out and removed from the main body 12. By reversing this procedure, the stopper 24 can be assembled and tightened on the main body 12. In this manner, since the handle 28 can be used as a fixture for attachment and detachment, when assembly operations or exchanging of parts are carried out, there is no need to separately prepare a fixture merely for the purpose of performing attachment and detachment, and the handle 28 can suitably be used to easily perform assembly and disassembly operations. For example, in the case that the first seat member 30 and the second seat member 32 become damaged or subject to wear, an advantage exists in that replacement thereof can be performed easily.

With the conventional technique disclosed in U.S. Patent Application Publication No. 2008/0283787, it is necessary for a spherical valve body 6 to be inserted into the interior of a first body 2*a* while being sandwiched between a pair of seal members 4*a*, 4*b*, thereby increasing the number of assembly steps. In contrast thereto, in the flow path opening/closing valve 10 according to the embodiment of the present invention, since the inner circumferential surface 18*b* on the side of the fluid inlet port 14 is curved in a concave shape and abuts against the outer circumferential surface 20*b* of the valve body 20, the seal member 4*a* in the conventional technique of U.S. Patent Application Publication No. 2008/0283787 is rendered unnecessary and can be dispensed with, whereby the number of component parts can be reduced. Further, at a time of assembly, in contrast to the conventional technique, it is sufficient merely for the valve body 20 and the sleeve 22 to be inserted into the valve chamber 18 of the main body 12, whereby the number of assembly steps can be reduced.

In the flow path opening/closing valve 10 according to the above-described embodiment, a structure has been described in which o-rings are used as elastic members, however, the invention is not limited to this feature. The elastic members may be constituted by other structures such as coil springs, for example, so long as such elastic members exhibit elastic forces for urging the first and second seat members 30, 32 toward the side of the valve body 20.

The flow path opening/closing valve according to the present invention is not limited to the above-described embodiment, and it is a matter of course that various additional or modified structures could be adopted therein without deviating from the essential gist of the present invention.

What is claimed is:

1. A flow path opening/closing valve comprising:
    a valve body having a through hole therein;
    a main body having a fluid inlet port and provided with a valve chamber accommodating the valve body rotatably therein;
    a stopper having a fluid outlet port communicating with the fluid inlet port and which is secured to the main body;
    a handle that rotates the valve body inside the valve chamber for blocking communication between the fluid inlet port and the fluid outlet port;
    a guide member that projects from the handle toward the main body, when the handle is attached to the main body; and
    a sleeve disposed in the interior of the main body and which slides against the valve body and is provided with a through hole therein that establishes communication between the fluid inlet port and the fluid outlet port,
    wherein a first annular groove is provided in a surface of the sleeve that faces toward the valve body, and a first seat member that slides against the valve body is arranged in the first annular groove,
    wherein a second annular groove is formed in the main body and confronts the first annular groove of the sleeve, a second seat member confronting the first seat member is provided in the second annular groove, the second seat member sliding against the valve body, and
    wherein multiple cutouts are provided on a side of the fluid outlet port of the stopper, whereas small projections are provided on the handle at a predetermined distance on each side of the guide member at positions corresponding to the positions of the multiple cutouts, the stopper being attachable and detachable with respect to the main body by engagement of the small projections in the cutouts.

2. The flow path opening/closing valve according to claim 1, wherein an elastic member is provided in the first annular groove of the sleeve so as to contact the seat member.

3. The flow path opening/closing valve according to claim 2, wherein the elastic member is an o-ring.

4. The flow path opening/closing valve according to claim 1, wherein an elastic member is provided in the second annular groove formed in the main body so as to contact the other seat member.

5. The flow path opening/closing valve according to claim 4, wherein the elastic member is an o-ring.

6. The flow path opening/closing valve according to claim 1, wherein a first screw member is provided on the stopper, a second screw member is provided on the main body, and by screw-engagement between the first screw member and the second screw member, the sleeve is pressed via the stopper, whereby the sleeve is pressed into contact with the valve body.

7. The flow path opening/closing valve according to claim 1, wherein the sleeve and the stopper are separate and whereby the sleeve is pressed, via the stopper, into contact with the valve body via the stopper.

8. The flow path opening/closing valve according to claim 1, wherein the guide member is substantially cylindrical.

9. The flow path opening/closing valve according to claim 8, wherein the outer diameter of the guide member is smaller than the inner diameter of the stopper, and the guide member fits into the stopper when the small projections are inserted into the multiple cutouts.

* * * * *